United States Patent [19]

Zeilinger

[11] 4,040,391
[45] Aug. 9, 1977

[54] ROTARY PISTON INTERNAL COMBUSTION ENGINE OF TROCHOIDAL CONSTRUCTION

[75] Inventor: Karl Zeilinger, Berglen-Hosslinswart, Germany

[73] Assignee: Daimler-Benz Aktiengesellschaft, Germany

[21] Appl. No.: 624,943

[22] Filed: Oct. 22, 1975

[30] Foreign Application Priority Data

Nov. 8, 1974   Germany .............................. 2453047

[51] Int. Cl.² ............................................ F02B 53/10
[52] U.S. Cl. .................................. 123/8.09; 123/8.27
[58] Field of Search .................... 123/8.09, 8.13, 8.27, 123/8.31

[56] References Cited

U.S. PATENT DOCUMENTS

| 3,227,145 | 1/1966 | Bernard | 123/8.27 X |
| 3,572,030 | 3/1971 | Cuff | 123/8.27 X |
| 3,868,930 | 3/1975 | Klomp et al. | 123/8.27 X |

Primary Examiner—Carlton R. Croyle
Assistant Examiner—Michael Koczo, Jr.
Attorney, Agent, or Firm—Craig & Antonelli

[57] ABSTRACT

A rotary piston internal combustion engine of trochoidal construction in which an intermediate chamber equipped with an injection nozzle for the fuel enrichment of the lean mixture sucked-in out of the inlet channel and conducted into the intermediate chamber is provided between the ignition chamber and the overflow channel, whereby automatic check valves for the control of the gas-exchange operations are arranged in the inlet and in the overflow channel.

10 Claims, 1 Drawing Figure

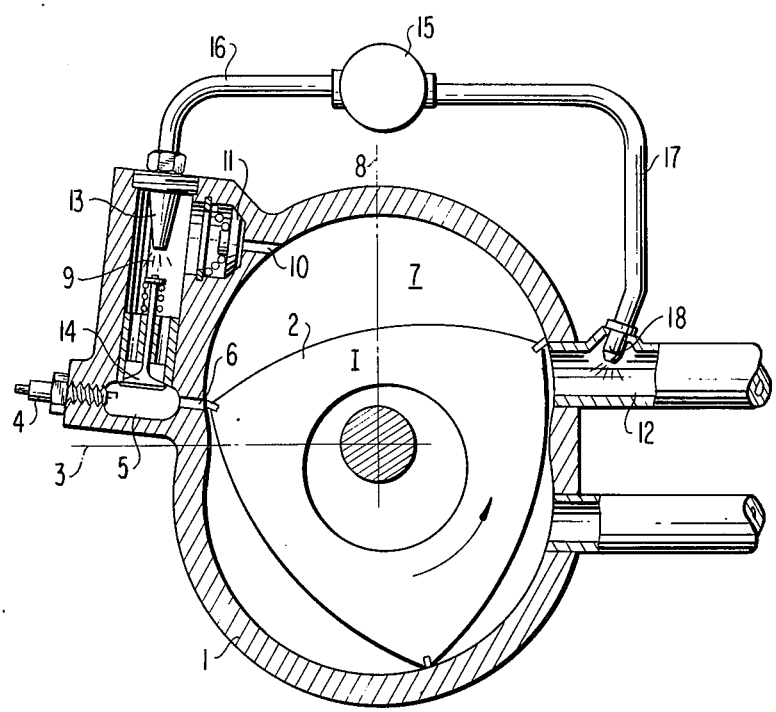

ROTARY PISTON INTERNAL COMBUSTION ENGINE OF TROCHOIDAL CONSTRUCTION

The present invention relates to a rotary piston internal combustion engine of trochoidal construction with working spaces formed by a casing and a piston rotating therein, with inlet and exhaust channels for the working space, with an ignition chamber in communication with a working space, which includes a spark plug and an inlet for a fuel-air mixture, and with an overflow channel connected with the ignition chamber by way of the inlet.

In such an internal combustion engine as described in the U.S. Pat. No. 47,579 of the East German Democratic Republic corresponding to U.S. Pat. No. 3,240,189, exclusively combustion air is conducted into an overflow channel, is charged thereat with fuel by means of an injection nozzle and is conducted as lean mixture to the ignition chamber, in which it is ignited by the spark plug.

Though a more efficient engine is attainable by such measures, an operation of the engine free of troubles, however, is not possible because no satisfactory scavenging can be achieved in the auxiliary combustion chamber which has as a consequence that the combustion gases that are under a high pressure, remain behind, which oppose the introduction of a fresh fuel-air mixture so that only an unsatisfactory ignition is attainable.

Accordingly, the present invention is concerned with the task to eliminate these shortcomings and to achieve such improvements with a rotary piston internal combustion engine of the aforementioned type as assure a more readily ignitable mixture during each ignition and an exhaust gas composition in full compliance with all requirements.

As solution to the underlying problems, it is proposed according to the present invention that an intermediate chamber with an injection nozzle for the fuel enrichment of the lean mixture sucked-in out of the inlet channel and conducted into the intermediate chamber is provided between the ignition chamber and the overflow channel and that check valves for the control of the gas interchanges are arranged in the inlet channel and in the overflow channel which operate fully automatically.

An extraordinarily advantageous scavenging of the ignition chamber is assured by the rich mixture precompressed in the intermediate chamber and forced into the ignition chamber by way of the valve. Furthermore, a satisfactory ignition characteristic of the engine is attainable— notwithstanding the use of a lean mixture in the working chambers.

Accordingly, it is an object of the present invention to provide a rotary piston internal combustion engine of trochoidal construction whcih avoids by simple means the aforementioned shortcomings and drawbacks encountered in the prior art.

Another object of the present invention resides in a rotary piston internal combustion engine of trochoidal construction which makes possible a completely satisfactory operation of the engine, free of troubles, with increased efficiency.

A further object of the present invention resides in a rotary piston internal combustion engine of trochoidal construction in which a satisfactory scavenging of the auxiliary combustion chamber is achieved.

Still a further object of the present invention resides in a rotary piston internal combustion engine of trochoidal construction in which a satisfactory ignition characteristic of the engine is attainable notwithstanding the use of a lean mixture in the working spaces.

These and other objects, features and advantages of the present invention will become more apparent from the following description when taken in connection with the accompanying drawing which shows, for purposes of illustration only, one embodiment in accordance with the present invention, and wherein:

The single FIGURE is a somewhat schematic cross-sectional view through a rotary piston internal combustion engine of trochoidal construction in accordance with the present invention.

Referring now to the single FIGURE of the drawing, a triangular piston 2 rotates in the direction of rotation indicated by the arrow within the trochoidally shaped casing 1 of a rotary piston internal combustion engine. An ignition chamber 5 equipped with a spark plug 4 is located shortly ahead of the minor axis 3 of the engine—as viewed in the direction of rotation of the piston—, which is in communication with the working spaces 7 formed by the casing 1 and the piston 2 by way of a firing channel 6. The spark plug 4 is disposed opposite the firing channel 6 in such a manner that the axis thereof is simultaneously the axis of the firing channel 6.

An overflow channel 10 equipped with a check valve 11, which terminates in an intermediate chamber 9, is arranged within the casing 1 of the rotary piston engine between the firing channel 6 and the major axis 8; a lean fuel-air mixture, sucked-in out of the inlet channel 12 is forced through the overflow channel 10 when the pressure in the working chamber 7 is sufficient to open a check valve 11. The intermediate chamber 9 whose axis extends perpendicularly to the spark plug axis is provided at its one end with an injection nozzle 13 and at its opposite end facing the ignition chamber 5 wih a further check valve 14. Both valves, namely the check valves 14 and 11, operate automatically and thus are not actuated by any actuating or drive means rotating or operating synchronously with the piston 2.

A fuel line 16 branching off from an injection installation 15 is connected with the injection nozzle 13. A further feed line 17 leads from this installation 15 to an injection nozzle 18 arranged in the inlet channel 12 in order to enrich the sucked-in air with fuel into a lean mixture.

This lean mixture flows as a result of the rotation of the piston 2 during the compression stroke into the intermediate chamber 9 by way of the check valve 11 opening automatically beginning with a predetermined pressure whereby this lean mixture is enriched with fuel in the intermediate chamber 9 into a rich mixture in the closing position of the valve 11 by way of the injection nozzle 13 which supplies the additional fuel.

As soon as the piston 2 has reached the position I in the direction of rotation, the previously combusted mixture expands from the ignition chamber 5 through the firing channel 6 into the next following working space. The pressure in the ignition chamber 5 drops and the check valve 14 opens under the effect of the higher pressure prevailing in the intermediate chamber 9 so that a rich mixture reaches the ignition chamber 5 from the intermediate chamber 9 and displaces thereat the residual, previously combusted mixture into the combustion space. During the compression stroke, the rich mixture is forced back into the gas space of the spark plug 4 by the lean mixture which is conducted into the ignition chamber 5 by way of the firing channel 6. The electrode of the spark plug 4 is thus located during each ignition within the rich mixture so that misfirings are prevented already beforehand which, in such types of engines, would lead to a jerky operation and to an uneven running.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A rotary piston internal combustion engine which includes a casing means and a piston means rotating in the casing means, working space means formed by said casing means and said piston means, inlet and exhaust channel means for the working space means, means for supplying a quantity of fuel into the inlet channel means so as to form a lean fuel-air mixture therein, an ignition chamber means in communication with a working space means and including a spark plug and an inlet for a fuel-air mixture, and overflow channel means in communication with a working space means, characterized in that an intermediate chamber means is interposed between the overflow channel means and the ignition chamber means with the inlet for the fuel-air mixture communicating the intermediate chamber means with the ignition chamber means, an injection nozzle means communicating with the fuel supplying means is arranged in the intermediate chamber means for injecting a quantity of fuel into the intermediate chamber means so as to enrich the lean fuel-air mixture sucked-in out of the inlet channel means and conducted to the intermediate chamber means by the overflow channel means, and in that valve means for the control of the gas interchange between the intermediate chamber means and the ignition chamber means and between the intermediate chamber means and the overflow channel means are respectively arranged in the inlet for the fuel-air mixture and in the overflow channel means.

2. A rotary piston internal combustion engine according to claim 1, characterized in that the valve means are automatically operating check valves.

3. A rotary piston internal combustion engine according to claim 2, characterized in that a longitudinal axis of the intermediate chamber means is at least approximately perpendicular to a longitudinal axis of the ignition chamber means.

4. A rotary piston internal combustion engine according to claim 3, characterized in that the ignition chamber means is in communication with the working space means by way of a firing channel, a longitudinal axis of the spark plug, the longitudinal axis of the ignition chamber means and a longitudinal axis of the firing channel being disposed substantially in the same direction.

5. A rotary piston internal combustion engine according to claim 4, characterized in that the spark plug axis, the ignition chamber axis and the firing channel axis are disposed substantially coaxially.

6. A rotary piston internal combustion engine according to claim 5, characterized in that the engine is of trochoidal construction.

7. A rotary piston internal combustion engine according to claim 1, characterized in that a longitudinal axis of the intermediate chamber means is at least approximately perpendicular to a longitudinal axis of the ignition chamber means.

8. A rotary piston internal combustion engine according to claim 1, characterized in that the ignition chamber means is in communication with the working space means by way of a firing channel, a longitudinal axis of the spark plug, a longitudinal axis of the ignition chamber means and a longitudinal axis of the firing channel being disposed substantially in the same direction.

9. A rotary piston combustion engine according to claim 8, characterized in that the spark plug axis, the ignition chamber axis and the firing channel axis are disposed substantially coaxially.

10. A rotary piston internal combustion engine according to claim 1, characterized in that the engine is of trochoidal construction.

* * * * *